US007986697B2

(12) United States Patent
Shahar et al.

(10) Patent No.: US 7,986,697 B2
(45) Date of Patent: Jul. 26, 2011

(54) METHOD FOR PROCESSING INFORMATION FRAGMENTS AND A DEVICE HAVING INFORMATION FRAGMENT PROCESSING CAPABILITIES

(75) Inventors: Boaz Shahar, Ra'Anana (IL); Liat Kochavi, Petah Tikva (IL); Noam Sheffer, Tel Aviv-Yaffo (IL); Michal Shmueli, Mevaseret-Zion (IL)

(73) Assignee: Freescale Semiconductor, Inc., Austin, TX (US)

( * ) Notice: Subject to any disclaimer, the term of this patent is extended or adjusted under 35 U.S.C. 154(b) by 183 days.

(21) Appl. No.: 12/304,187

(22) PCT Filed: Jun. 13, 2006

(86) PCT No.: PCT/IB2006/051895
§ 371 (c)(1),
(2), (4) Date: Dec. 10, 2008

(87) PCT Pub. No.: WO2007/144702
PCT Pub. Date: Dec. 21, 2007

(65) Prior Publication Data
US 2009/0323710 A1   Dec. 31, 2009

(51) Int. Cl.
*H04L 12/28* (2006.01)
(52) U.S. Cl. ............ 370/394; 370/230.1; 370/231; 370/395.4; 370/413; 370/473; 370/474
(58) Field of Classification Search ............ 370/230, 370/230.1, 231, 389, 394, 395.4, 412, 413, 370/473, 474
See application file for complete search history.

(56) References Cited

U.S. PATENT DOCUMENTS

| 5,337,313 | A | * | 8/1994 | Buchholz et al. | 370/394 |
| 5,914,954 | A | * | 6/1999 | Nakayama | 370/394 |
| 6,002,686 | A | * | 12/1999 | Mitts et al. | 370/394 |
| 6,608,813 | B1 | * | 8/2003 | Chiussi et al. | 370/218 |
| 6,654,377 | B1 | * | 11/2003 | Pasternak et al. | 370/395.4 |
| 6,658,007 | B1 | * | 12/2003 | Pasternak et al. | 370/395.4 |
| 6,760,305 | B1 | * | 7/2004 | Pasternak et al. | 370/230 |
| 6,771,600 | B2 | * | 8/2004 | Kawarai et al. | 370/230 |

(Continued)

OTHER PUBLICATIONS

Borghs et al; "Prototyping ethernet in the first mile over poiny-to-point copper"; 13th IEEE International Workshop on Rapid System Prototyping, Jul. 2002.

*Primary Examiner* — Moe Aung
*Assistant Examiner* — Christopher P Grey

(57) ABSTRACT

A device and method for processing information fragments, the method includes: receiving multiple information fragments from multiple communication paths; wherein the each information fragment is associated with a cyclic serial number indicating of a generation time of the information fragment; storing the multiple information fragments in multiple input queues, each input queue being associated with a communication path out of the multiple communication paths; determining whether at least one serial number associated with at least one valid information fragment positioned in a head of one of the multiple input queues is located within a pre-rollout serial number range; mapping, in response to the determination, serial numbers associated with each of the valid information fragment positioned in the heads of the multiple input queues to at least one serial number range that differs from the pre-rollout serial number range; and sending to an output queue information fragment metadata associated with a minimal valued serial number out of the serial numbers associated with each of the valid information fragment positioned in the heads of the multiple input queues.

17 Claims, 4 Drawing Sheets

U.S. PATENT DOCUMENTS

| | | | |
|---|---|---|---|
| 6,778,495 B1 * | 8/2004 | Blair | 370/230 |
| 6,791,992 B1 | 9/2004 | Yun et al. | |
| 6,862,282 B1 | 3/2005 | Oden | |
| 6,879,590 B2 | 4/2005 | Pedersen et al. | |
| 7,116,667 B2 * | 10/2006 | Jiang et al. | 370/394 |
| 7,245,615 B1 * | 7/2007 | Potter et al. | 370/389 |
| 7,613,110 B1 * | 11/2009 | Blair | 370/230 |
| 2001/0015957 A1 * | 8/2001 | Kawarai et al. | 370/230 |
| 2002/0031086 A1 * | 3/2002 | Welin | 370/229 |
| 2002/0156908 A1 | 10/2002 | Basso et al. | |
| 2003/0179751 A1 | 9/2003 | Omae et al. | |
| 2004/0064430 A1 | 4/2004 | Klein et al. | |
| 2005/0030974 A1 | 2/2005 | Wright et al. | |
| 2005/0190779 A1 | 9/2005 | Hoffman et al. | |

* cited by examiner

METHOD FOR PROCESSING INFORMATION FRAGMENTS AND A DEVICE HAVING INFORMATION FRAGMENT PROCESSING CAPABILITIES

FIELD OF THE INVENTION

The present invention relates to methods for processing information fragments and to devices having information fragment processing capabilities.

BACKGROUND OF THE INVENTION

Old access networks (such as the Plain Old Telephone System) used pairs of copper wires to provide telephone services to domestic users. As telecommunication technology evolved these pairs of copper wires were used to convey broadband transmissions. Telecommunication technology evolved by defining communication standards, utilizing multiple-queue switched and routers and improving the throughput and capabilities of network elements. The following U.S. patents and patent applications, all being incorporated herein by reference, illustrate some modern telecommunication devices: U.S. patent application serial number 2005/0190779 of Hoffman et al., U.S. patent application serial number 2004/0064430 of Klein et al., U.S. patent application serial number 2003/0179751 of Omae et al., U.S. patent application serial number 2005/0030974 of Wright et al., and U.S. Pat. No. 6,879,590 of Pedersen et al.

Ethernet technology gradually replaces Asynchronous Transport Mode (ATM) technology. A new group of standards, generally referred to as Ethernet in the First Mile (EFM), defines ways to utilize Ethernet technology at the access network. An EFM-compliant transmitter can receive (or generate) a stream of packets, fragment these packets to provide information fragments, associate serial numbers with information fragments encapsulate these information fragments with a header and a trailer and utilize different communication paths for transmitting these information fragments. The serial numbers reflect the generation time (or order) of the information fragments. The serial numbers are generated by a cyclic serial number generator, such as a k-bit counter, k being a positive integer.

The headers may include the serial number as well as a start of packet bit and an end of packet bit that indicate whether the information fragment is the first information fragment (or the last) of a packet. The trailer as well as the payload can include error correction fields such as an information packet CRC field, an information fragment CRC and the like.

The different communication paths (usually different physical links) can have different transmission characteristics (such as bit rate, delay, delay jitter, and the like), so that the multiple information fragments that are transmitted over the multiple communication paths arrive to a receiver out of order.

There is a need to provide efficient methods and devices for processing information fragments.

SUMMARY OF THE PRESENT INVENTION

A device and a method for processing information fragments, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Embodiments of the present invention illustrated in the accompanying drawings provide a method for processing information fragments and a device that is capable of processing information fragments.

According to an embodiment of the invention a device is capable of determining the order of cyclic serial numbers (serial numbers that are generated by a finite modulo serial number generator that has a rollover point) by selectively mapping cyclic serial numbers that belong to a pre-rollout serial number range to another range of serial numbers. This mapping is applied on all the cyclic serial numbers that are located at the head of input queues. The input queues can store the information fragments, metadata relating to the information fragments or a combination thereof.

After the mapping stage information representative of the smallest serial number is sent to an output queue. It is noted that if the cyclic serial numbers are allocated in a counter-clockwise manner than the greatest serial number is provided.

Conveniently, information fragments associated with the serial numbers can be validated. Additionally or alternatively the device and method can determine that a communication path malfunctions.

Conveniently, by monitoring metadata associated with information fragment located in head of input queues and not in the whole input queues the sorting is greatly simplified. In addition, by storing the information fragments once (while manipulating metadata) the storage process is highly efficient. The mapping of serial numbers simplifies the location of the first serial number out of a group of serial numbers and allows using standard minimal/maximal finding circuits.

Figure 1:
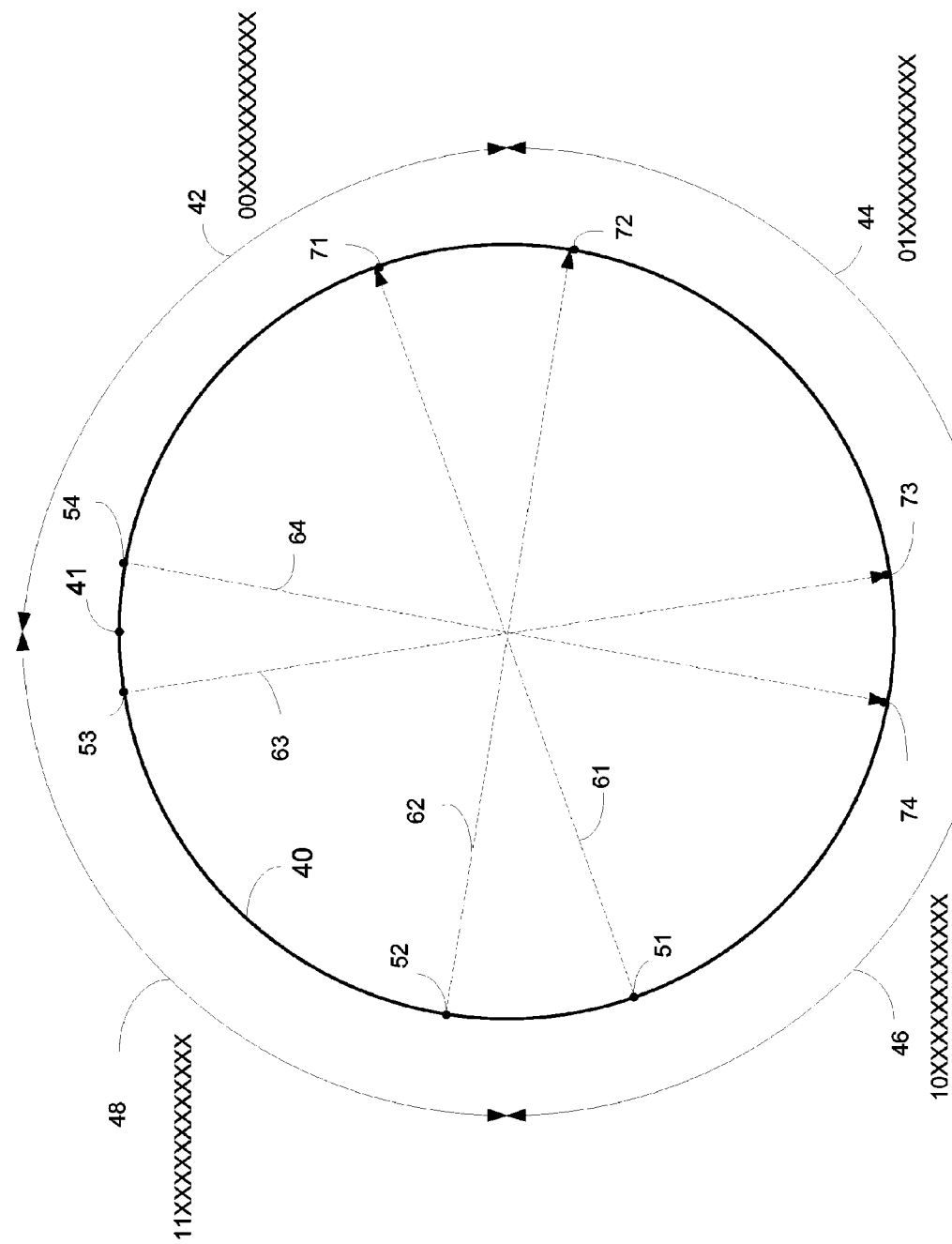
FIG. 1 illustrates multiple serial number ranges and mapped serial numbers, according to an embodiment of the invention.

FIG. 1 illustrates multiple serial number ranges 42-48 and mapped serial numbers, according to an embodiment of the invention.

The serial numbers are generated in a cyclic manner, as illustrated by circle 40. Circle 40 represents the full range of serial numbers. It is assumed that the serial numbers include k-bits thus, circle 40 is representative of $2^k$ different serial numbers that typically range between zero and $2^k-1$.

Circle 40 has a rollout (or rollover) point 41 that corresponds to serial number zero. Rollout point 41 is preceded by pre-rollout serial number range 48. Circle 40 also includes other ranges such as first till third ranges 42, 44 and 46. For convenience of explanation each zone is defined by the two most significant bits of the serial number. Ranges 42, 44, 46 and 48 are characterized by two most significant bit values of '00', '01', '10' and '11'. Assuming that k equals 14 then the ranges correspond to serial numbers '00xxxxxxxxxxxx', '01xxxxxxxxxxxx', '10xxxxxxxxxxxx' and '11xxxxxxxxxxxx', wherein x is a don't care bit that can represent either one or zero.

Four exemplary serial numbers 51, 52, 53 and 54 are located at zones 46, 48, 48 and 42 accordingly.

Assuming that the order of the serial numbers is responsive to the smallest distance between the serial numbers (as one serial number can be reached by clockwise or counterclockwise along circle 40) then the information fragment associated with fourth serial number 54 was transmitted after the information fragments associated with third serial number 53, second serial number 52 and first serial number 51. Nevertheless, the value of fourth serial number 54 is smaller than the values of first till third serial numbers 51, 52 and 53. Accordingly, the maximal values serial number is not necessarily associated with the last transmitted information fragment.

In order to utilize maximum or minimum finding functions or circuitries the serial numbers are mapped by applying a mapping function, if one (or more) serial numbers belongs to pre-rollout serial number range 48. Conveniently, the mapping can include rotating the serial numbers by 180 degrees, as illustrated by arrows 61-64 and mapped serial numbers 71-74.

Referring to FIG. 1, the mapping is applied when serial numbers that start by "11" are received. Accordingly, serial numbers from first range 42 will be followed by serial numbers from second range 44, serial numbers from third range 46 and then mapped serial numbers that are mapped from pre-rollout serial number range 48 to second range 44.

This mapping arranges the serial number such that the order of the serial number corresponds to their value—higher values serial numbers are associated with information fragments that were received after information fragments associated with lower values serial numbers.

Figure 2:
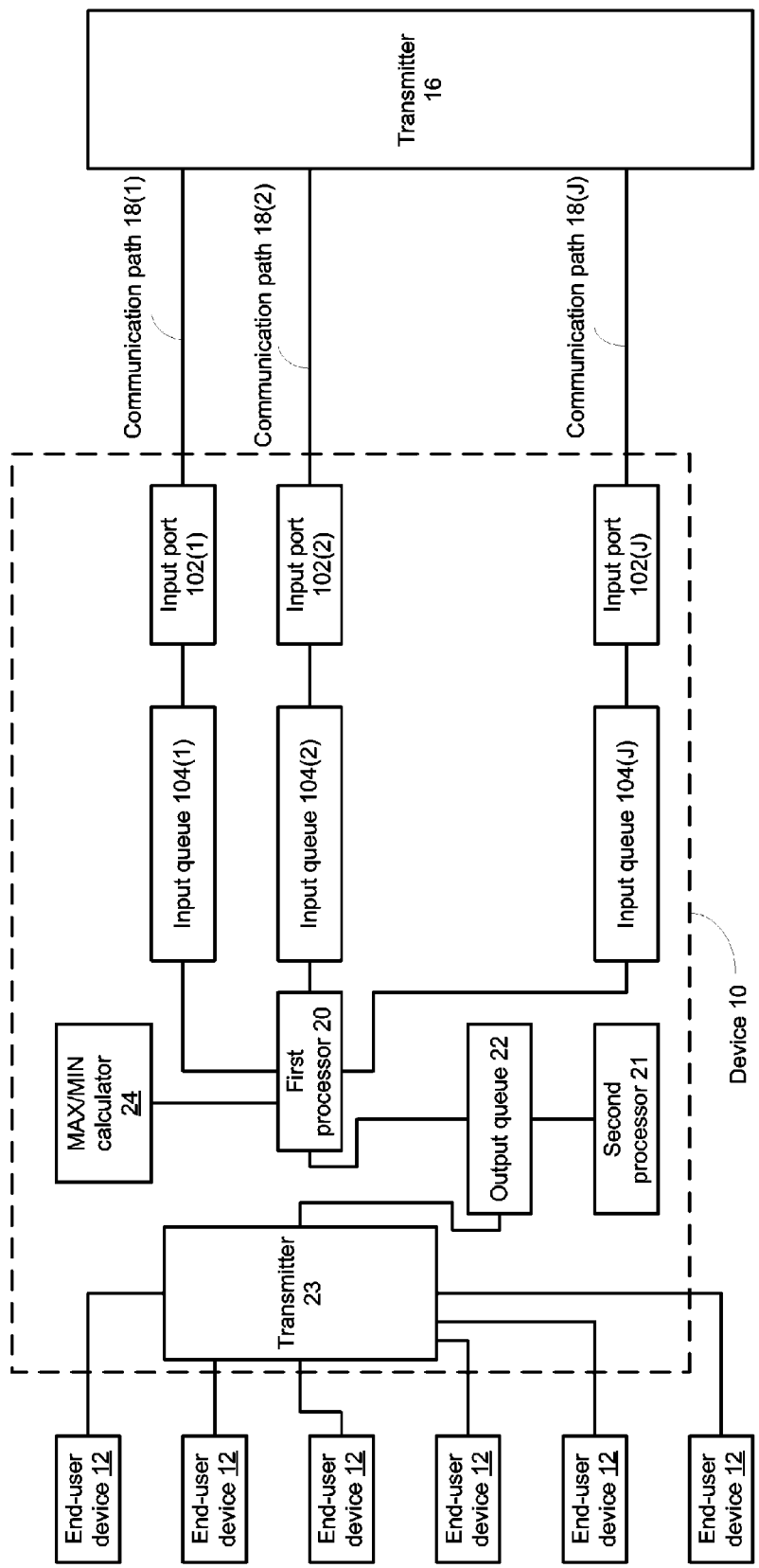
FIG. 2 illustrates a device and its environment according to an embodiment of the invention.

FIG. 2 illustrates a device 10 and its environment 11 according to an embodiment of the invention.

It is noted that device 10 can exchange information with end-user devices 12, although FIG. 2 illustrates only a transmission of information from transmitter 16 to device 10 and towards end-user devices 12. The transmission of information from end-user devices 12 to device 1—and towards a receiver (not shown) requires another transmitter (not shown) in device 10 and requires a receiver that is positioned at the other ends of communication paths 18.

Device 10 is connected between many end-user devices 12 and between multiple communication paths 18(1)-18(J). The multiple communication paths (collectively denoted 18) are connected to transmitter 16 that is adapted to: (i) receive or generate a stream of packets, (ii) fragment these packets to provide information fragments, (iii) associate cyclic serial numbers with information fragments, (iv) encapsulate these information fragments with a header and a trailer, and (v) transmit the different information over communication paths 18 towards device 10.

Device 10 includes output queue 22, multiple input queues 104(1)-104(J) (collectively denoted 104), first processor 20 and optionally a second processor 21. First processor 20 provides reconstructed information packets to the output queue 22 while the second processor can process these packets and send them to end user devices 12. It is noted that first and second processors 20 and 21 can be integrated to form a single processor, that they can be located near each other but this is not necessarily so.

Each input queue is associated with a single communication path. It is assumed that information fragments that are stored at a certain input queue are stored in an ordered manner, although some information fragments can be missing, due to communication path faults.

Device 10 includes multiple input ports 102(1)-102(J), one for each communication path. It is noted that if the number of input ports differs from the number of communication paths then device 10 can includes an input interface that sends to each input queue the appropriate information fragments.

According to an embodiment of the invention metadata associated with the information fragments, such as but not limited to a serial number and a pointer to the information fragment can be stored with the information fragments payload but this is not necessarily so. Conveniently, metadata is stored in different entries or in different queues and output queue 22 stores pointers to information fragment payloads, and does not store the information payloads. Accordingly, the information fragment payloads are stored at a single location until being fetches by second processor 22 while metadata can be duplicated, processed and/or deleted.

For simplicity of explanation first processor 20 is referred to as processor 20.

Processor 20 is adapted to: (i) determine whether at least one serial number associated with at least one valid information fragment positioned in a head of one of the multiple input queues 104(1)-104(J) is located within pre-rollout serial number range 48, (ii) map, in response to the determination, serial numbers associated with each of the valid information fragment positioned in the heads of the multiple input queues 104 to at least one serial number range (such as first till third ranges 42-46) that differs from pre-rollout serial number range 48; and (iii) send to output queue 22 information fragment metadata associated with a minimal valued serial number out of the serial numbers associated with each of the valid information fragment positioned at the heads of multiple input queues 104(1)-104(J).

It is noted that some of the input queues can be masked, either in response to a mask provided by a user or in response to a detection of a transmission failure.

According to an embodiment of the invention processor 20 defines a next expected serial number in response to the minimal valued serial number. For example, the next expected serial number can equal the last serial number that was provided to output queue 22 plus one.

Conveniently, processor 20 is adapted to increase the next expected serial number by one, after a current serial number is provided to output queue 22.

According to another embodiment of the invention processor 20 can validate an information fragment positioned at a head of an input queue by calculating a difference between the serial number of the information fragment to the next expected serial number. Conveniently, if the difference exceeds a difference threshold the information fragment is invalidated. The difference threshold can be determined in response to the expected bit rates of the various communication paths, to the range of the serial numbers, to expected error rates associated with the different communication paths and the like.

According to yet another embodiment of the invention the validation can include comparing a certain serial number associated with the information fragment that is located at the head of an input queue with (i) other serial numbers associated with other information fragments within the same input queue and with (ii) serial numbers associated with other information fragments located within other heads of queues and if that certain serial number substantially differs from these serial numbers determining that it is invalid.

Conveniently, processor 20 performs the mapping by inverting at least one most significant bit of serial numbers associated with each of the valid information fragment positioned in the heads of the multiple input queues. The inventors inverted the most significant bit of a 14-bit serial number by performing a XOR operation with a control bit that toggled each time that a mapping was done.

Conveniently, processor 20 is adapted to compare between amounts of information fragments stored in different input queues in order to determine which communication paths are active. If a certain input queue stores a certain amount of information fragments while another input queue stores less than another amount of information fragments then processor 20 can determine that the other communication path is faulty. The relationship between the different amounts depends upon the expected bit rates of each communication paths, timing variations between the communication paths and the like. For example, if first communication path 18(1) is expected to provide X information fragments while second communication path 18(1) is expected to provide, during substantially the same period 2*X information fragments, first input queue 104(1) stores X information fragments and second input queue 104(2) stores much less than 2*X information fragments then processor 20 can determine that second communication path 18(2) does not properly function and send an indication to transmitter 18. In addition it can wait till second input queue is emptied and then ignore the second queue during further processing information.

If processor 20 detects that a certain communication path became non-active it can update the expected serial number by increasing it by more then one, if the expected next serial number is not found in other input queues and it probably was transmitted over the previously active communication path. The expected next serial number is not found if the difference between the next expected serial number and the minimal valued serial number exceeds a predefined threshold. The predefined threshold can equal one but this is not necessarily so.

Conveniently, second processor 21 is adapted to reconstruct information packets out of information fragments associated with metadata that is stored in the output queue.

According to an embodiment of the invention processor 20 is adapted to discard information fragments that belong to an information packet if one of the information fragments that belong to information packet is not received. It is noted that if output queue 22 includes metadata relating to a certain information fragment and another information fragment that belonged to the same information packet was lost then that metadata will be erased from output queue 22.

Output queue 22 can be a buffer descriptor ring that includes multiple buffer descriptors that can store pointers to information fragments, whereas the buffer descriptors are arranged in a cyclic manner so that each buffer descriptor also points to the next buffer descriptor and the last buffer descriptor points to the first buffer descriptor. Second processor 21 can scan the buffer descriptor ring 22 and retrieve one information fragment after the other.

Output queue 22 is accessed by transmitter 23 that transmits information packets towards end-user devices 12.

Conveniently, first processor 20 is connected to a hardware accelerator that performs high-speed calculation of minimum or maximum of values out of a vectors of values. This accelerator is denoted "MAX/MIN calculator" 24 and can also receive a mask vector that indicates which elements of the vector should be taken into account.

Figure 3:
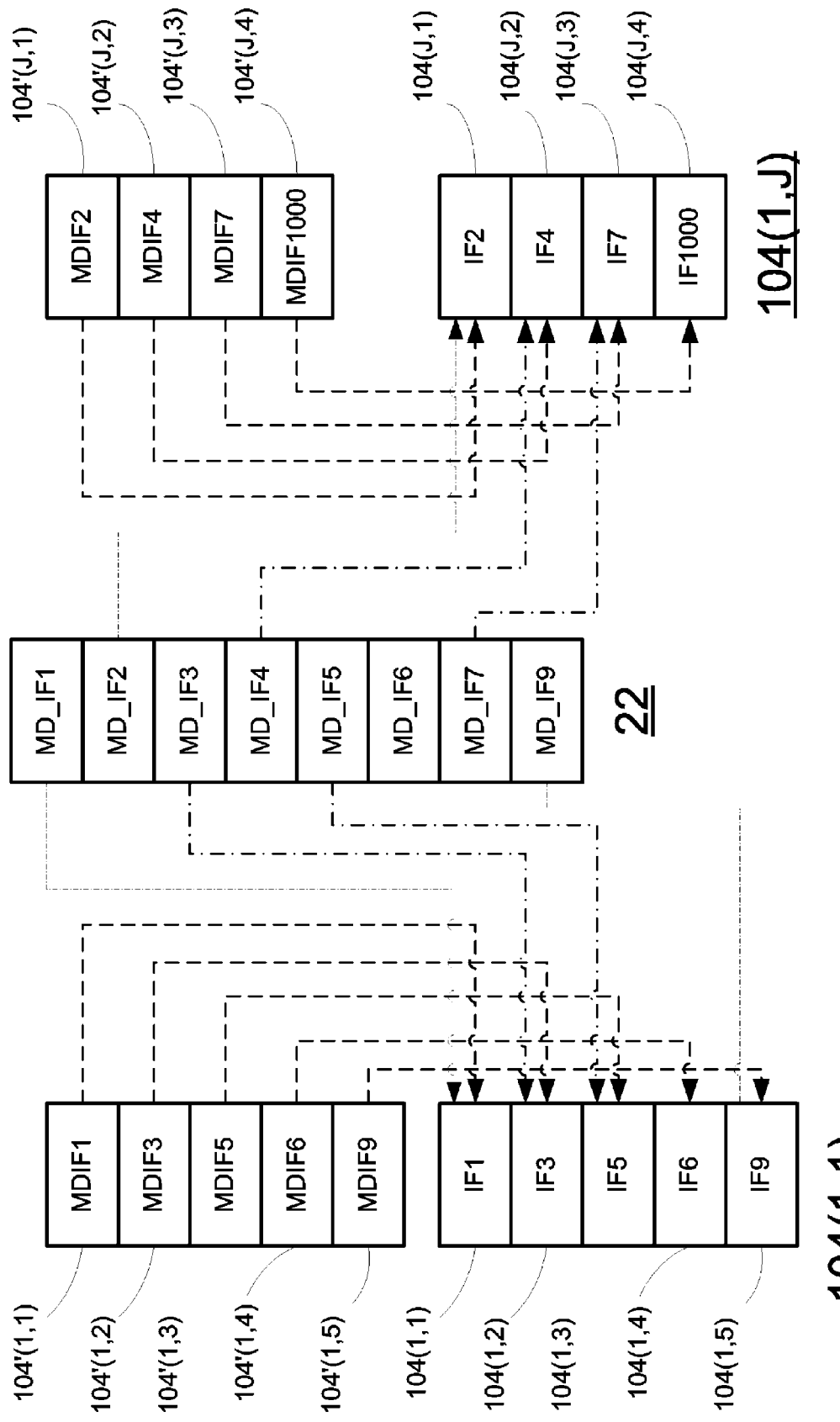
FIG. 3 illustrates the content of various input queues according to an embodiment of the invention.

FIG. 3 illustrates the content of various input queues 104(1) and 104(J) according to an embodiment of the invention.

FIG. 3 illustrates input queues 104(1) and 104(J) as storing information fragment payloads at one location while storing metadata (including serial numbers) at another location. The metadata includes pointers to the information fragment payloads, as indicated by dashed arrows 130. Output queue 22 stores metadata including pointers that point to the information fragment payloads, as indicated by dashed arrows 140.

First input queue 104(1) stores information fragments IF1, IF3, IF5, IF6 and IF9 that are associated with numbers 1, 3, 5, 6 and 9 at entries 104(1,1), 104(1,2), 104(1,3), 104(1,4) and 104(1,5). Metadata associated with these information fragments (including serial numbers, pointers) MDIF1, MDIF3, MDIF5, MDIF6 and MDIF9 are stored at entries 104'(1,1), 104'(1,2), 104'(1,3), 104'(1,4) and 104'(1,5).

J'th input queue 104(J) stores information fragments IF2, IF4, IF7 and IF8 that are associated with serial numbers 2, 4, 7 and 1000 at entries 104(J,1), 104(J,2), 104(J,3) and 104(J,4). Metadata associated with these information fragments (including serial numbers, pointers) MDIF2, MDIF4, MDIF7 and MDIF1000 are stored at entries 104'(J,1), 104'(J,2), 104'(J,3) and 104'(J,4).

The following table illustrates exemplary stages that are executed by first processor.

TABLE 1

| Head of 104(1)/ Information fragment | Head of 104(J)/ Information fragment | Output queue entry number | Pointer in the output queue entry | comments |
| --- | --- | --- | --- | --- |
| 104(1, 1)/IF1 | 104(J, 1)/IF2 | | | INIT |
| 104(1, 1)/IF1 | 104(J, 1)/IF2 | 22(1) | IF1 | IF1 selected |
| 104(1, 2)/IF3 | 104(J, 1)/IF2 | 22(2) | IF2 | IF2 selected |
| 104(1, 2)/IF3 | 104(J, 2)/IF4 | 22(3) | IF3 | IF3 selected |
| 104(1, 3)/IF5 | 104(J, 2)/IF4 | 22(4) | IF4 | IF4 selected |
| 104(1, 3)/IF5 | 104(J, 3)/IF7 | 22(5) | IF5 | IF5 selected |
| 104(1, 4)/IF6 | 104(J, 3)/IF7 | 22(6) | IF6 | IF6 selected |
| 104(1, 5)/IF9 | 104(J, 3)/IF7 | 22(7) | IF7 | IF7 selected |
| 104(1, 5)/IF9 | 104(J, 4)/IF1000 | 22(8) | IF9 | Ignore IF1000 |

After the iterations illustrated in TABLE 1 output queue 22 stores, in entries 22(1)-22(8) metadata (MD_IF1-MD_IF7 and MD_IF9) associated with IF1-IF7 and IF9. The metadata includes pointers to IF1-IF7 and IF9. If one or more of these information fragments originated from the same information packet as IF1000 then that metadata will be erased from output queue. For simplicity of explanation it is assumed (and illustrated) that neither one of IF1-IF8 did not belong to the same information packet as IF1000.

Figure 4:
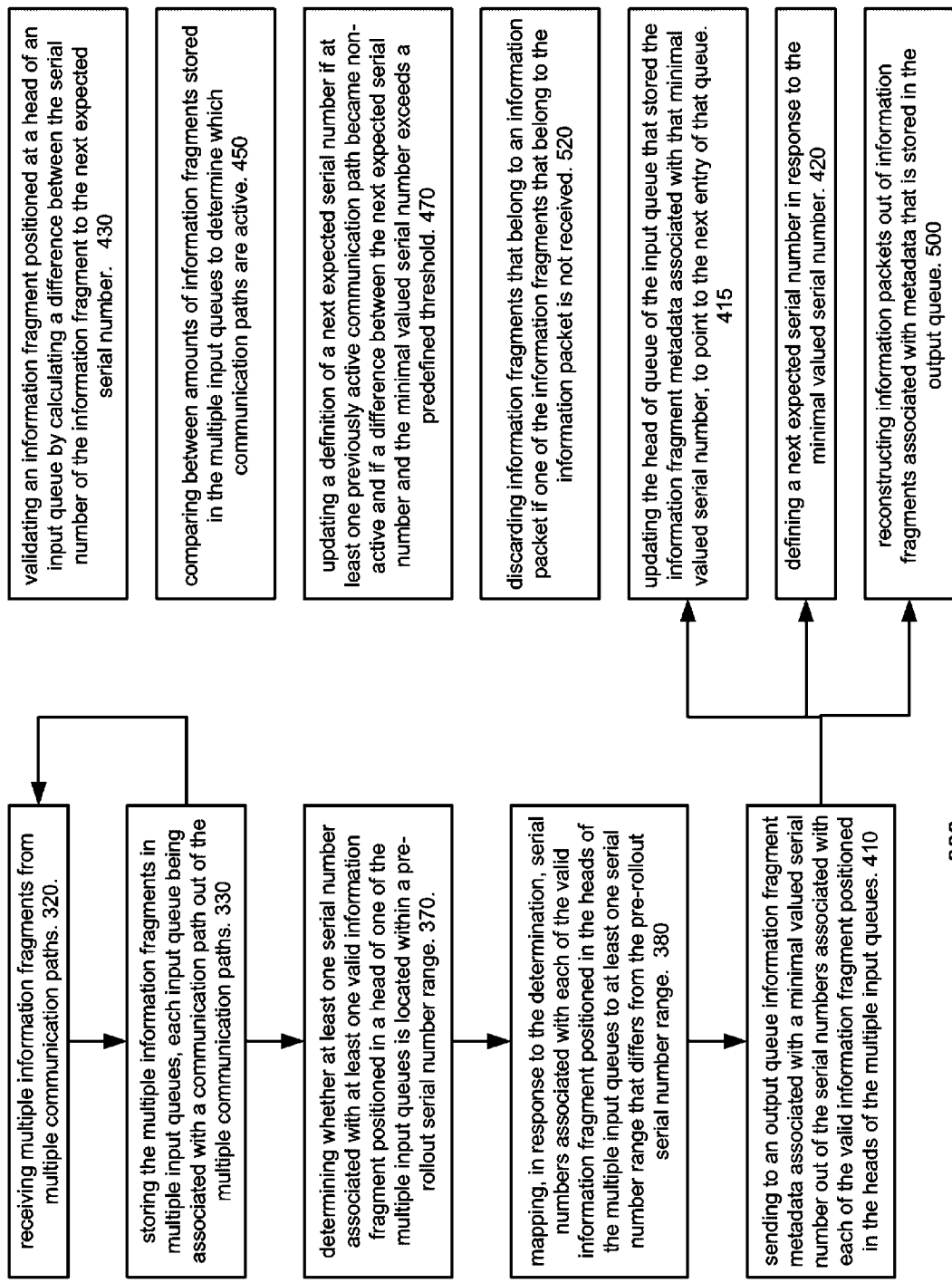
FIG. 4 illustrates a method for processing information fragments, according to an embodiment of the invention.

FIG. 4 illustrates method 300 for processing information fragments, according to an embodiment of the invention.

Method 300 starts by stage 320 of receiving multiple information fragments from multiple communication paths. Each information fragment is associated with a cyclic serial number indicating an generation time of the information fragment. The generation time defines when the information fragment was generated, conveniently by segmenting an information packet and adding a header and/or a trailer.

Stage 320 is followed by stage 330 of storing the multiple information fragments in multiple input queues, each input queue being associated with a communication path out of the multiple communication paths.

Stage 330 can be followed by stage 320 (indicating that additional information fragments are received during the processing of the stored information fragments) and is also followed by stage 370.

Stage 370 includes determining whether at least one serial number associated with at least one valid information fragment positioned in a head of one of the multiple input queues is located within a pre-rollout serial number range.

Stage 370 is followed by stage 380 of mapping, in response to the determination, serial numbers associated with each of the valid information fragment positioned in the heads of the multiple input queues to at least one serial number range that differs from the pre-rollout serial number range. Thus, if at least one serial number associated with at least one valid information fragment positioned in a head of one of the multiple input queues is located within a pre-rollout serial number range then the mapping is performed, else—no mapping is performed.

Stage 380 may include inversing at least one most significant bit of serial numbers associated with each of the valid information fragment positioned in the heads of the multiple input queues.

Stage 380 is followed by stage 410 of sending to an output queue information fragment metadata associated with a minimal valued serial number out of the serial numbers associated with each of the valid information fragment positioned in the heads of the multiple input queues.

Stage 410 is followed by stages 415, 420 and 500. Stage 415 includes updating the head of queue of the input queue that stored the information fragment metadata associated with that minimal valued serial number, to point to the next entry of that queue. Stage 415 is followed by jumping to stage 370.

Stage 420 includes defining a next expected serial number in response to the minimal valued serial number.

Stage 500 includes reconstructing information packets out of information fragments associated with metadata that is stored in the output queue.

Method 400 can also include at least one of optional stages 430, 450, 470 and 520. These stages can occur in parallel to other stages of method 400.

Stage 430 includes validating an information fragment positioned at a head of an input queue by calculating a difference between the serial number of the information fragment to the next expected serial number.

Stage 450 includes comparing between amounts of information fragments stored in the multiple input queues to determine which communication paths are active.

Stage 470 includes updating a definition of a next expected serial number if at least one previously active communication path became non-active and if a difference between the next expected serial number and the minimal valued serial number exceeds a predefined threshold.

Stage 520 includes discarding information fragments that belong to an information packet if one of the information fragments that belong to the information packet is not received.

It is noted that although the mentioned above description related to information fragments generated form information packets that the illustrated methods and devices can be applied mutatis mutandis on other groups of bits and subgroups of bits. For example, an information frame can be segmented to form information packets.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method comprising:
receiving information fragments from a first communication path and from a second communication path, each information fragment associated with a respective serial number indicating a generation time of that information fragment, and wherein the serial numbers are cyclic serial numbers;
storing information fragments received from the first communication path at a first input queue and storing information fragments received from the second communication path at a second input queue, the first input queue including a first head and the second input queue including a second head;
determining that a first information fragment at the first head is valid and that a binary representation of a first serial number associated with the first information fragment includes two most-significant bits each having a value of binary one;
updating, in response to the determining, the first serial number and a second serial number, the second serial number associated with a second information fragment at the second head, wherein updating comprises inverting a most-significant bit of the first and second serial numbers, respectively;
selecting, in response to the updating, the first input queue or the second input queue based on evaluating which of the first and the second serial numbers is smaller; and
sending information fragment metadata included at the respective head of the selected input queue to an output queue.

2. The method according to claim 1 further comprising defining a next expected serial number based on the serial number associated with the information fragment at the head of the selected input queue.

3. The method according to claim 2 further comprising determining that an information fragment positioned at a head of an input queue is valid by calculating a difference between a serial number associated with the information fragment and the next expected serial number.

4. The method according to claim 2 further comprising comparing amounts of information fragments stored in the first and second input queues to determine which communication paths are active.

5. The method according to claim 2 further comprising reconstructing information packets out of information fragments associated with metadata that is stored in the output queue.

6. The method according to a claim 1 further comprising comparing amounts of information fragments stored in the first and second input queues to determine which communication paths are active.

7. The method according to claim 6 further comprising updating a definition of a next expected serial number if at least one previously active communication path became non-active and if a difference between the next expected serial number and the serial number associated with the information fragment at the head of the selected input queue exceeds a predefined threshold.

8. The method according to claim 1 further comprising reconstructing information packets out of information fragments associated with metadata that is stored in the output queue.

9. The method according to claim 1 further comprising discarding information fragments that belong to an information packet if one of the information fragments that belong to the information packet is not received.

10. A device comprising:
a first input queue for receiving information fragments from a first communications path, the first queue having a first head;
a second input queue for receiving information fragments from a second communications path, the second queue having a second head, wherein each information fragment is associated with a respective serial number indicating a generation time of the corresponding information fragment, and wherein the serial numbers are cyclic serial numbers;

an output queue; and a processor, the processor operable to:
- determine that a first information fragment at the first head is valid and that a binary representation of a first serial number associated with the first information fragment includes two most-significant bits each having a value of binary one;
- update, in response to the determining, the first serial number and a second serial number, the second serial number associated with a second information fragment at the second head, wherein updating comprises inverting a most-significant bit of the first and second serial numbers, respectively;
- select, in response to the updating, the first input queue or the second input queue based on evaluating which of the first and the second serial numbers is smaller; and
- send information fragment metadata included at the respective head of the selected input queue to the output queue.

11. The device according to claim 10 wherein the processor is further operable to define a next expected serial number based on serial number associated with the information fragment at the head of the selected input queue.

12. The device according to claim 11 wherein the processor is further operable to determine that an information fragment positioned at a head of an input queue is valid by calculating a difference between a serial number associated with the information fragment and the next expected serial number.

13. The device according to claim 10 wherein the processor is further operable to compare amounts of information fragments stored in the first and second input queues to determine which communication paths are active.

14. The device according to claim 13 wherein the processor is further operable to update a definition of a next expected serial number if at least one previously active communication path became non-active and if a difference between the next expected serial number and the serial number associated with the information fragment at the head of the selected input queue exceeds a predefined threshold.

15. The device according to claim 10 wherein the processor is further operable to reconstruct information packets out of information fragments associated with metadata that is stored in the output queue.

16. The device according to claim 10 wherein the processor is further operable to discard information fragments that belong to an information packet if one of the information fragments that belong to the information packet is not received.

17. An information processing apparatus comprising the device of claim 10.

* * * * *

UNITED STATES PATENT AND TRADEMARK OFFICE
CERTIFICATE OF CORRECTION

PATENT NO.       : 7,986,697 B2                                        Page 1 of 1
APPLICATION NO.  : 12/304187
DATED            : July 26, 2011
INVENTOR(S)      : Boaz Shahar et al.

It is certified that error appears in the above-identified patent and that said Letters Patent is hereby corrected as shown below:

Column 9, Line 24, please change "based on serial" to --based on the serial--

Signed and Sealed this
Twentieth Day of March, 2012

David J. Kappos
*Director of the United States Patent and Trademark Office*